(12) United States Patent
Regan et al.

(10) Patent No.: US 7,270,513 B2
(45) Date of Patent: Sep. 18, 2007

(54) APPARATUS AND METHOD FOR GENERATING POWER FROM MOVING WATER

(76) Inventors: Colin Regan, #504-1375 Nicola Street, Vancouver, British Columbia (CA) V6G 2G1; Johann Hoffmann, Rua Nayda Salles, Teixeira - No. 110, #102, Bairro Camargos (BR)

( * ) Notice: Subject to any disclaimer, the term of this patent is extended or adjusted under 35 U.S.C. 154(b) by 36 days.

(21) Appl. No.: 10/615,451

(22) Filed: Jul. 8, 2003

(65) Prior Publication Data
US 2004/0096310 A1 May 20, 2004

(51) Int. Cl.
*F03B 7/00* (2006.01)

(52) U.S. Cl. ............... 416/85; 416/132 R; 416/132 A; 416/200 R; 416/201 A; 416/240; 416/DIG. 2; 416/DIG. 4; 415/3.1; 415/4.1; 415/7; 415/121.2; 415/141; 415/133; 440/90; 440/91

(58) Field of Classification Search .............. 415/2.1, 415/3.1, 4.1, 7, 121.2, 140–141, 129, 133, 415/905–906; 416/84–86, 131, 132 R, 132 A, 416/223 R, 240, DIG. 2, DIG. 4, 200 R, 416/201 A; 290/42–43, 53–54; 440/90–91
See application file for complete search history.

(56) References Cited

U.S. PATENT DOCUMENTS

| | | | | |
|---|---|---|---|---|
| 385,261 A | * | 6/1888 | Garrison | 416/85 |
| 867,192 A | * | 9/1907 | Dawson | 290/43 |
| 904,892 A | * | 11/1908 | Pattosien | 290/54 |
| 970,196 A | * | 9/1910 | Dougine | 416/85 |
| 972,010 A | * | 10/1910 | McCreary | 416/85 |
| 1,396,609 A | * | 11/1921 | Weisenborn | 415/7 |
| 2,413,173 A | * | 12/1946 | Cote | 440/91 |
| 2,442,783 A | * | 6/1948 | Senn | 416/240 |
| 2,812,737 A | * | 11/1957 | Hoover | 440/91 |
| 3,923,416 A | * | 12/1975 | Frey | 416/240 |

(Continued)

FOREIGN PATENT DOCUMENTS

DE 3408959 A1 9/1985

(Continued)

*Primary Examiner*—Christopher Verdier
(74) *Attorney, Agent, or Firm*—Jennifer L. Skord; Moore & Van Allen, PLLC

(57) ABSTRACT

Apparatus for generating power from a water current in a body of water comprises a longitudinally extending flotation platform for maintaining the apparatus afloat in the body of water and a water turbine operatively carried by the platform for generating power in response to water current in the body of water. The platform is configured to enhance the flow of water current over the turbine blades and, as well, to enable a number of like platforms each with an associated turbine or turbines to be arrayed in a cooperative manner. The water turbine may comprise a turbine rotor with a plurality of relatively narrow, flexible elongated blades arranged in circumferentially spaced rows extending along the rotor. In each row, the blades are distanced from each other in succession by a space. The rows may be staggered with respect to each other such that the blades in a given one of the rows circumferentially align with the spaces between blades in the row immediately circumferentially forward of the given row and with the spaces between blades in the row immediately circumferentially rearward of the given row.

17 Claims, 12 Drawing Sheets

U.S. PATENT DOCUMENTS

| | | |
|---|---|---|
| 3,986,787 A | 10/1976 | Mouton, Jr. et al. |
| 4,104,536 A | 8/1978 | Gutsfeld |
| 4,205,943 A | 6/1980 | Vauthier |
| 4,241,283 A * | 12/1980 | Storer, Sr. .................... 290/54 |
| 4,253,795 A * | 3/1981 | McQueen ................... 415/125 |
| 4,335,093 A * | 6/1982 | Salomon ....................... 290/43 |
| 4,383,797 A | 5/1983 | Lee |
| 4,446,378 A | 5/1984 | Martinez Parra |
| 4,519,742 A | 5/1985 | Van Buytene |
| 4,590,386 A * | 5/1986 | Wiggs ......................... 290/54 |
| 5,834,853 A | 11/1998 | Ruiz et al. |
| 5,937,644 A * | 8/1999 | Dipnall ...................... 416/240 |
| 5,946,909 A | 9/1999 | Szpur |

FOREIGN PATENT DOCUMENTS

| | | |
|---|---|---|
| DE | 4026638 A1 | 2/1992 |
| DE | 4112730 A1 | 8/1992 |
| EP | 0 045 353 | 2/1982 |
| JP | 58-104370 A * | 6/1983 |

* cited by examiner

APPARATUS AND METHOD FOR GENERATING POWER FROM MOVING WATER

FIELD OF THE INVENTION

The present invention relates to the generation of power, including mechanical power or electrical power, from the flow of water against the blades of a water turbine. Further, the present invention relates to flotation platforms for such turbines.

BACKGROUND TO THE INVENTION

A variety of water turbine designs suitable for harnessing the power of moving water are known in the art. These designs include turbines which have a plurality of circumferentially spaced turbine blades each extending continuously for substantially the full length of the turbine rotor and radially outwardly therefrom. As well, they include turbines which have sets of turbine blades which are longitudinally spaced from each other along a turbine shaft. Within each set, a plurality of circumferentially spaced blades extend radially outward from the shaft. Examples of the latter kind of turbines may be seen in U.S. Pat. No. 5,834,853 granted Nov. 10, 1998 (Ruiz et al.) and U.S. Pat. No. 5,946,909 granted Sep. 7, 1999 (Szpur).

However, such designs do not provide for an enhanced flow of water current over the turbine blades, and a consequent improvement in power output. Nor do they provide supporting structures which are well adapted for movement in a body water and which may be configured to further enhance the flow of water current over the blades. Further, the structures which they do provide cannot be arrayed in any cooperative way.

BRIEF SUMMARY OF THE INVENTION

In one aspect of the present invention, there is provided apparatus for generating power from a water current in a body of water (e.g. a river or a canal), which apparatus comprises a longitudinally extending flotation platform for maintaining the apparatus afloat in the body of water and a water turbine operatively carried by the platform for generating power in response to water current in the body of water. The platform includes a forward part having opposed diverging sides extending outwardly and rearwardly from a forward end apex to first and second elongated rearward parts, the first rearward part extending longitudinally rearwardly from the forward part, the second rearward part extending longitudinally rearwardly from the forward part substantially parallel to the first rearward part; and a downward opening through the platform between the first and second rearward parts. The water turbine comprises a turbine rotor and a plurality of turbine blades. The rotor longitudinally extends transversely across the downward opening between opposed ends of the rotor, and is rotatably mounted to the platform for rotation about a rotor axis. The turbine blades extend outwardly from the rotor for operative communication with the water current through the opening.

In all cases, the downward opening through the platform preferably is laterally bounded by opposed downwardly and longitudinally extending inner side walls for channelling water current communicating with said blades.

A platform having a forward part and first and second rearward parts as described above may be adapted to operatively carry more than one water turbine. For example, the platform may include a third elongated rearward part positioned between the first and second rearward parts and extending longitudinally rearwardly from the forward part substantially parallel to the first and second rearward parts. A first longitudinal opening extends downwardly through the platform between the first and third rearward parts. A second downward opening extends downwardly through the platform between the second and third rearward parts. A first water turbine as described above is mounted to the platform with its rotor extending transversely across the first downward opening, and a second water turbine as described above is mounted to the platform with its rotor extending transversely across the second downward opening. Preferably, the first downward opening is laterally bounded by opposed downwardly and longitudinally extending inner side walls for channelling water current communicating with blades of the first water turbine. Likewise, preferably, the second downward opening is laterally bounded by opposed downwardly and longitudinally extending inner side walls for channelling water current communicating with blades of the second water turbine.

Depending on the circumstances, the provision of more than one water turbine on a platform may or may not be considered advantageous. Redundancy is one possible advantage. If one turbine breaks down or requires servicing or is simply shut down, then the other turbine can serve to continue delivering power. One disadvantage of more than one turbine on a platform is added complexity because each turbine will require its own mountings and associated power take-off apparatus.

In a further aspect of the present invention, there is provided a method of generating power from a water current in a body of water (e.g. a river or a canal), such method comprising:

providing a first power generation station comprising a longitudinally extending flotation platform for maintaining the station afloat in the body of water and a water turbine operatively carried by the platform for generating power in response to a water current in the body of water;

floating the station in the body of water with a forward end of the platform directed upstream in the water current; and, controllably restraining downstream movement of the platform.

In accordance with the method, the platform comprises a forward part having opposed diverging sides, each extending outwardly and rearwardly from a forward end apex of the platform to first and second elongated rearward parts. The first rearward part extends longitudinally rearwardly from the forward part to a first distal end; and the second rearward part extends longitudinally rearwardly from the forward part substantially parallel to the first rearward part to a second distal end. A longitudinal opening extends downwardly through the platform between the first and second rearward parts.

The water turbine comprises a turbine rotor and a plurality of turbine blades. The rotor is mounted to the platform for rotation about a rotor axis and extends transversely across the opening. The turbine blades extend outwardly from the rotor for operative communication with water current through the opening.

In circumstances where a water current flow has substantial width (e.g. as in a wide river), several of such stations may be utilized. Advantageously, the stations may be arranged in an array of stations. For example, the method may further include:

providing second and third power generation stations, each comprising a flotation platform substantially the same as the flotation platform of the first power generation station;

floating the second station in the body of water with a forward end apex of its platform positioned proximate to the first distal end of the first station's platform; and, floating the third station in the body of water with a forward end of its platform positioned proximate to the second distal end of the first station's platform.

To facilitate such positioning of second and third power stations proximate to the first and second distal ends of the first power station, the distal ends of the first power station preferably have an angle of taper which conforms with the angle at which the diverging sides of the forward part of the platform extend rearwardly from the forward end apex of the platform.

Additional power generation stations may be similarly positioned behind the second and third power generation stations.

In another aspect of the present invention, there is provided a water turbine preferably used in conjunction with the foregoing apparatus or method, but which may also be used at a fixed (viz. not floating installation) where the turbine blades extending outwardly from a turbine rotor advantageously are relatively narrow, flexible elongated blades and are arranged in circumferentially spaced rows extending along the rotor. In each row, the blades are distanced from each other in succession by a space. The blades engage and slow the flow of water, the slowing effect being greater closer to the turbine axis. The result is a water current along the length of the blades. The blades are bent forwardly by the pressure on the blades leading to a degree of equalization of water flow over the blades and around the blades. The flow generates a whirling effect which contributes to the flow of water along the blades and, combined with the slowing effect described above, facilitates an increased power output. The power generated increases with the depth of the driving water flow.

Preferably, the rows are staggered such that the blades in a given one of the rows circumferentially align with the spaces between blades in the row immediately circumferentially forward of the given row and with the spaces between blades in the row immediately circumferentially rearward of the given row. Water flowing between the blades in one row then will hit blades in a following row with greater speed than if the blades within the respective rows were not staggered. The result of this arrangement is a more uniform slowing of the water current, a pressure force on one side of the blades and a suction force on the opposed side of the blades.

The foregoing and other features and advantages of the present invention will now be described with reference to the drawings.

DETAILED DESCRIPTION

Figure 4:
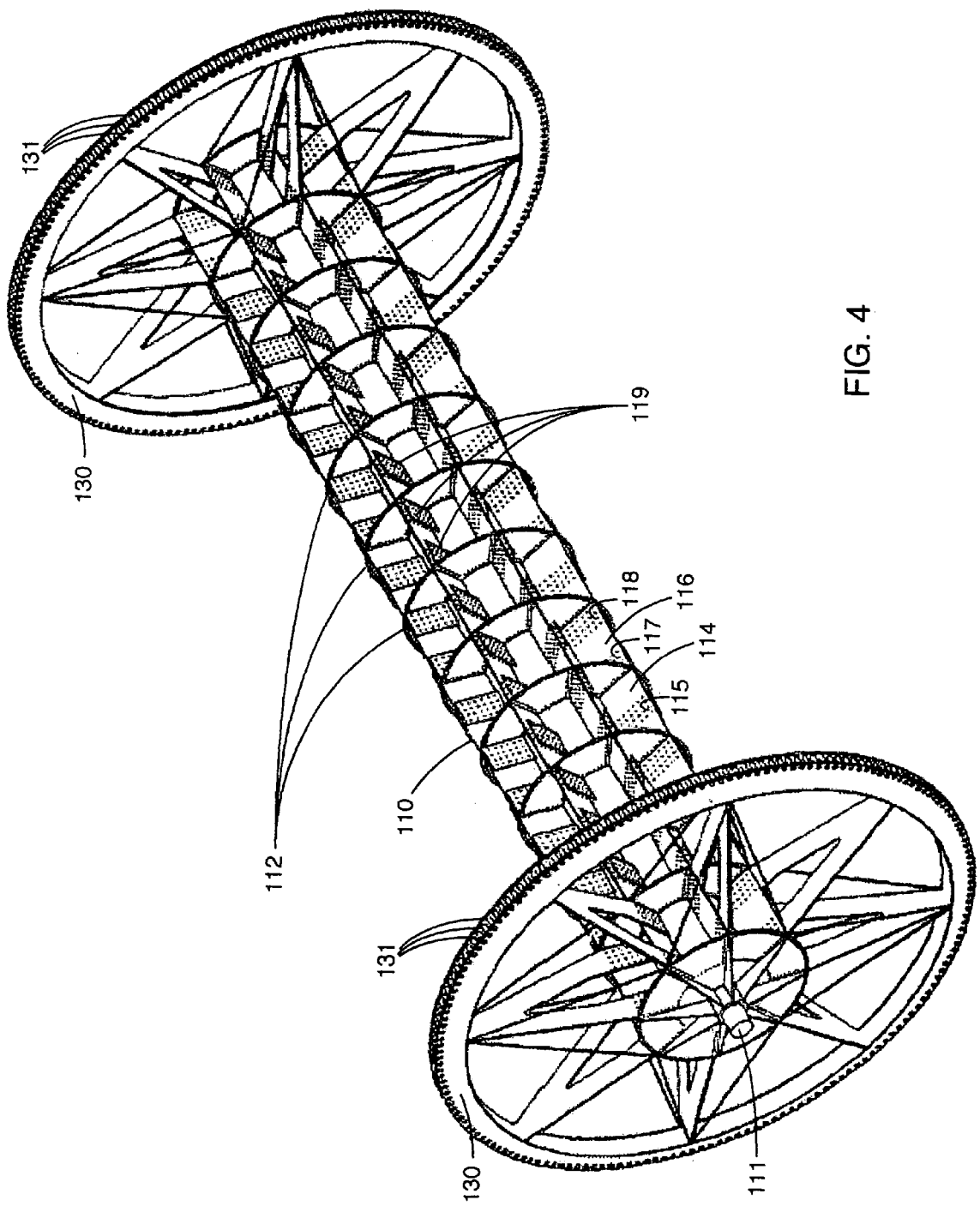
FIG. 4 is a perspective view showing in more detail the turbine rotor and transfer gears forming part of the embodiment shown in FIG. 1.

FIGS. 1-12 illustrate a power generation station generally designated 100 comprising a longitudinally extending flotation platform generally designated 10 for maintaining the station afloat in a body of water (not shown) and a water turbine generally designated 101 operatively carried by the platform for generating power in response to a current in the body of water. Turbine 101 comprises a turbine rotor 110 and a plurality of relatively narrow elongated turbine blades 120 of varying length extending outwardly from the rotor for operative communication with the water current. The rotor includes an axle 111 (FIG. 4). When the platform is properly positioned, current normally flows cross-axially in the direction of arrow F.

Platform 10 includes a forward part 12 having opposed diverging sides 13, 14 extending outwardly and rearwardly from a forward end apex 11 to first and second elongated rearward parts 15, 18. Rearward part 15 extends longitudinally rearwardly from forward part 12 to a tapered distal end 16, and includes an associated cowling 17 discussed below. Rearward part 18 extends longitudinally rearwardly from forward part 12 and substantially parallel to reward part 15 to a tapered distal end 19 and includes an associated cowling 20 discussed below. A longitudinal opening 21 extends downwardly through the platform between rearward parts 15, 18. Generally, platform 10 is symmetric about either side of a longitudinal center line 22 (see FIG. 2) bisecting forward end apex 11.

Normally, platform 10 is positioned with its forward end apex 11 directed upstream (viz. the direction opposed to the direction of arrow F). A deflector 25 is mounted to the platform just in advance of apex 11 to protect that end and to help deflect logs or other debris that may be floating downstream in the water. The diverging sides 13, 14 of forward part 12 (which serve to provide streamlining in a water current flow) also serve to steer logs and other debris smoothly away from the platform. Such features reduce the chances that floating debris will be forced under platform 10 towards turbine blades 120.

Figure 11:
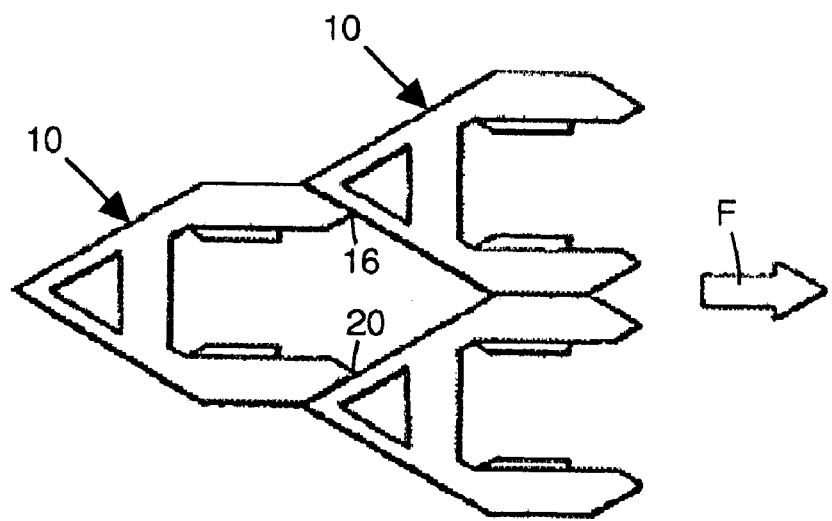
FIG. 11 is a top view of an arranged array of three flotation platforms like that shown in FIG. 7, each for carrying a turbine in accordance with the present invention.
Figure 12:
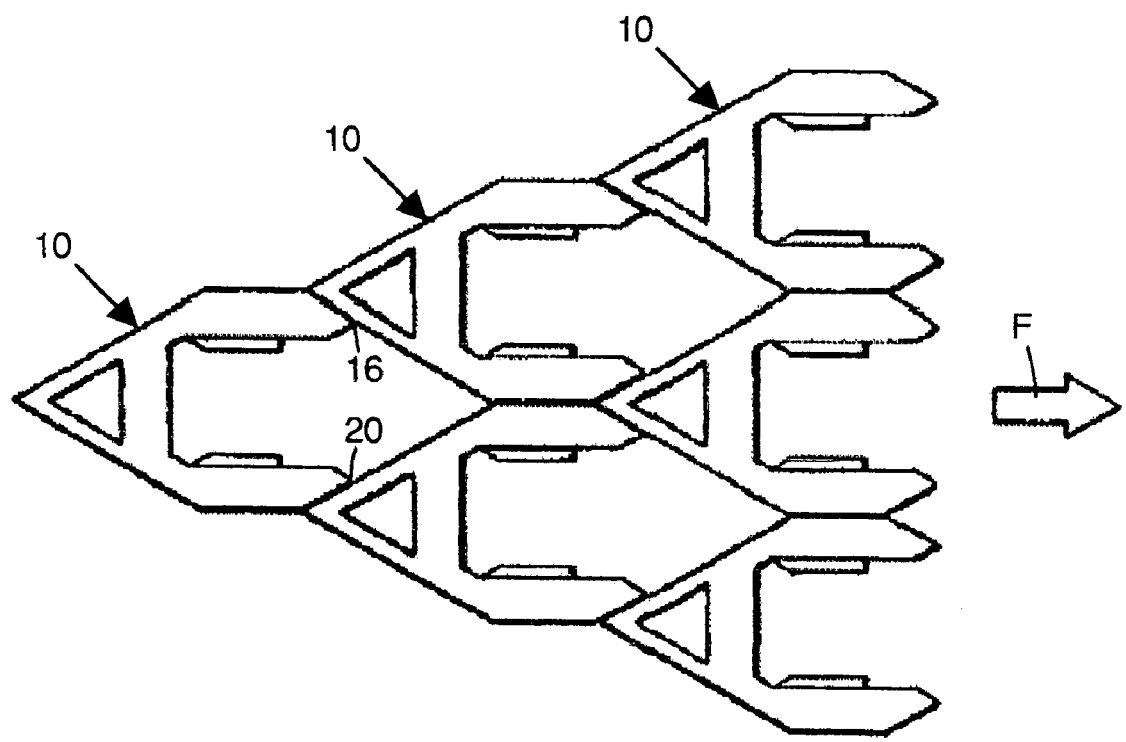
FIG. 12 is a top view of another arranged array of six flotation platforms like that shown in FIG. 7, each for carrying a turbine in accordance with the present invention.

As will be best understood from FIGS. 11-12, the overall shape of platform 10 enables arrays of power generation stations to be arranged in a manner which provides overall streamlining and whereby any given platform provides a debris deflection shield or a partial deflection shield for platforms extending downstream from the given platform. More particularly, in FIG. 11 which shows a generally triangular array of three platforms, first and second trailing platforms 10 have been positioned with their respective forward end apexes 11 in abutment proximity to distal ends 16, 19 of a leading platform 10 and with the rearward part 15 of one of the trailing platforms in abutment proximity to the rearward part 18 of the other of the trailing platforms. In FIG. 12, the array shown in FIG. 11 has been extended to include a third line of three platforms for a total of six platforms. Such arrays may be used to develop a larger overall energy output.

Figure 5:
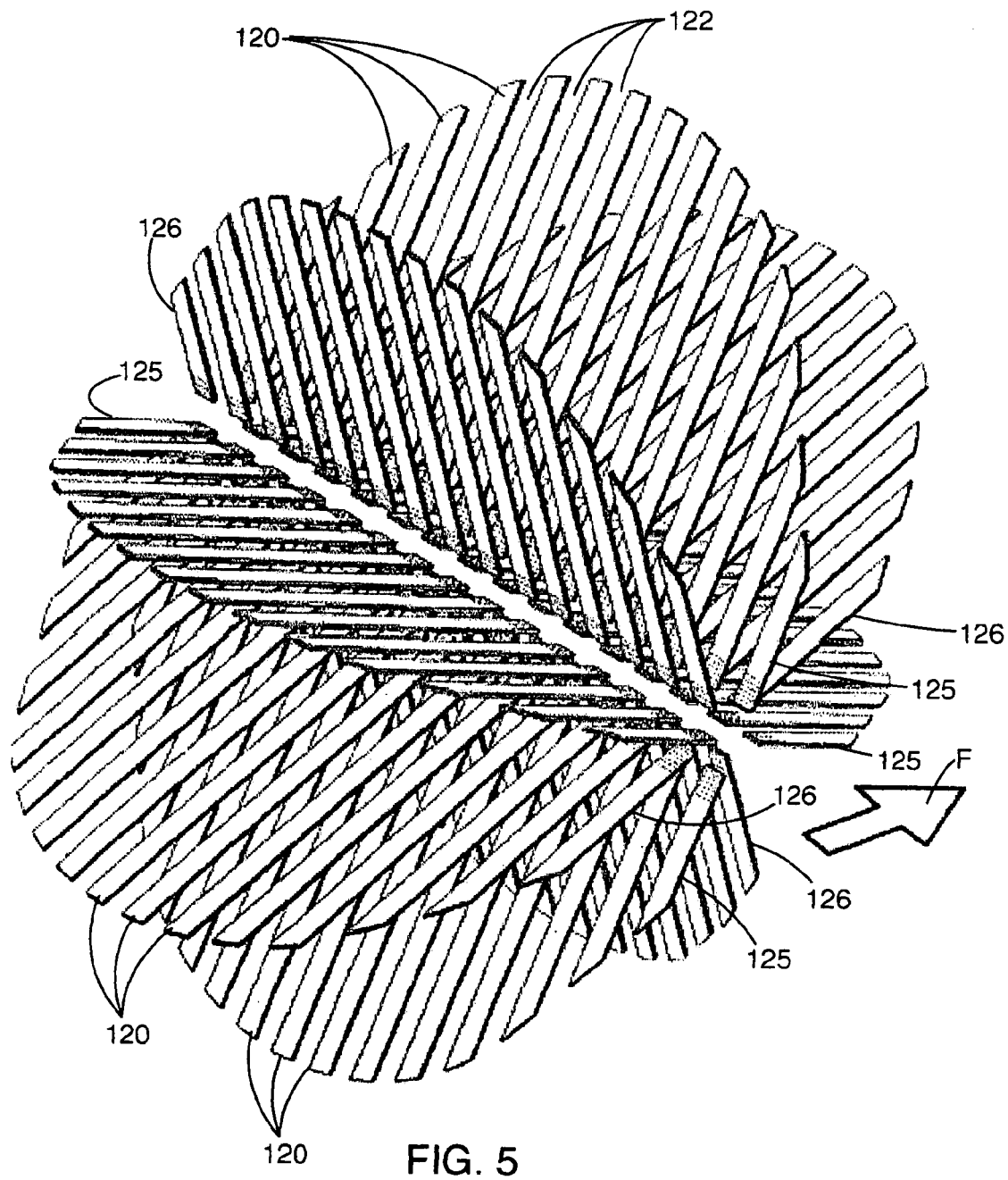
FIG. 5 is a perspective view showing the relative positions of turbine blades forming part of the embodiment shown in FIG. 1.

Blades 120 of turbine 101 are arranged in eight rows circumferentially spaced, alternately staggered rows 125, 126, 125, 126, etc. (best seen in FIGS. 5-6). Each row extends along the length of turbine rotor 110. Adjacent blades in any given row are separated from one another by spaces 122. As best seen in FIG. 5, the staggering between rows is such that blades 120 in any given row are aligned with the spaces 122 between the blades in the row immediately forward thereof and with the spaces 122 between the blades in the row immediately rearward thereof. Thus, as a portion of a water current flows against blades 120 in a given row, a remaining portion will flow through spaces 122 in the given row and initially towards blades 120 in the next row downstream.

Figure 6:
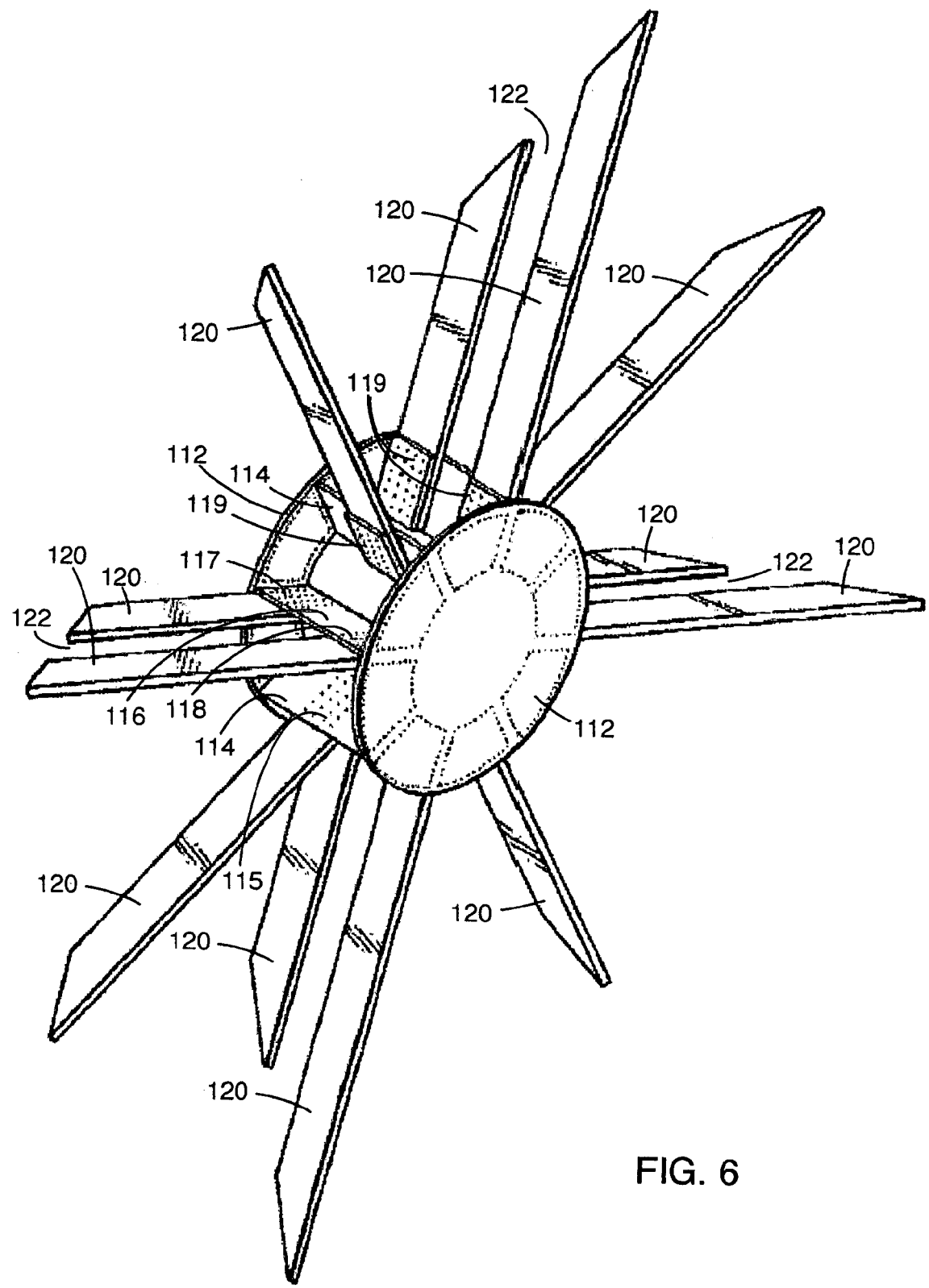
FIG. 6 is a perspective view showing a portion of the turbine rotor illustrated in FIG. 4 and associated turbine blades attached thereto.
Figure 7:
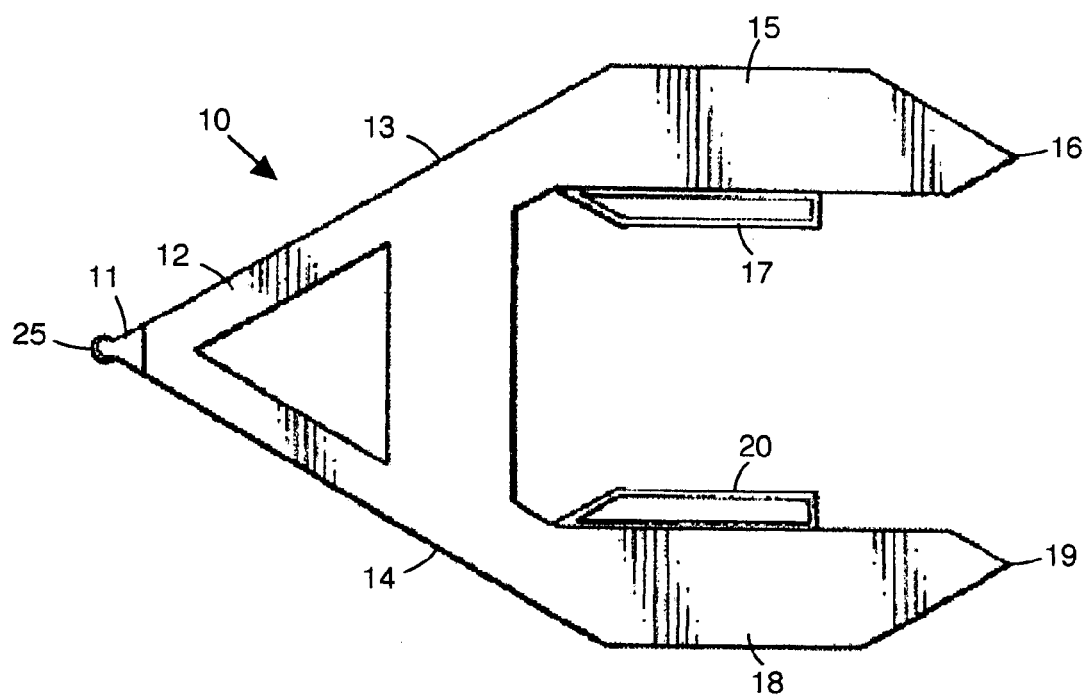
FIG. 7 is a top view of the flotation platform shown in FIG. 1.
Figure 8:
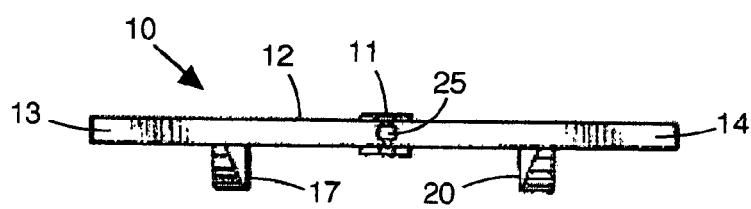
FIG. 8 is a front elevation view of the platform shown in FIG. 1
Figure 9:
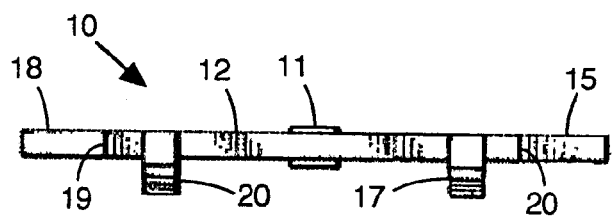
FIG. 9 is an end elevation view of the platform shown in FIG. 1.
Figure 10:
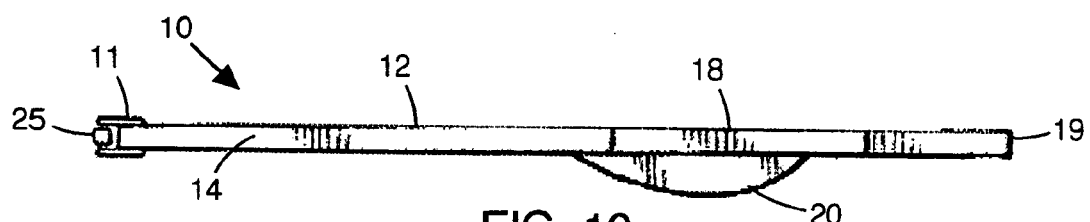
FIG. 10 is a side elevation view of the platform shown in FIG. 1.

Rotor 110 extends transversely across opening 21 for rotation about a rotor axis, one end of the rotor being rotatably mounted to rearward part 15 of platform 10, the opposed end of the rotor being rotatably mounted to rearward part 18 of platform 10. As best seen in FIG. 4, rotor 110 has a modular structure comprising a series of axially aligned circular flanges 112 which are spaced longitudinally along the length of the rotor. Adjacent pairs of flanges 112 are adjoined by longitudinally extending rectangular flanges 114, 116 which are radially distanced from and spaced circumferentially around the axis of the rotor. As best seen in FIG. 6, flanges 114 are adapted to enable attachment of a single turbine blade 120, whereas flanges 116 are adapted to enable attachment of two turbine blades 120. More particularly, each flange 114 includes a single array of bolt holes 115 which is centrally disposed between opposed ends of the flange. A blade 120 with a corresponding array of holes at its radially inward end is bolted to flange 114 with bolts (not shown) which extend through the flange, through the blade, and through a protective face plate 119 which also includes a corresponding array of holes. In contrast, each flange 116 includes two arrays of bolt holes 117, 118 each disposed at one end of the flange. These arrays facilitate the bolted attachment of two blades 120 to flange 116 in the same manner as a single blade 120 is attached to flange 114, including the use of face plates 119. (Note that the positions of face plates 119 as depicted in FIG. 4 are the positions they will have when used to bolt blades 120 to rotor 110. Otherwise, they are separate elements.)

Figure 1:
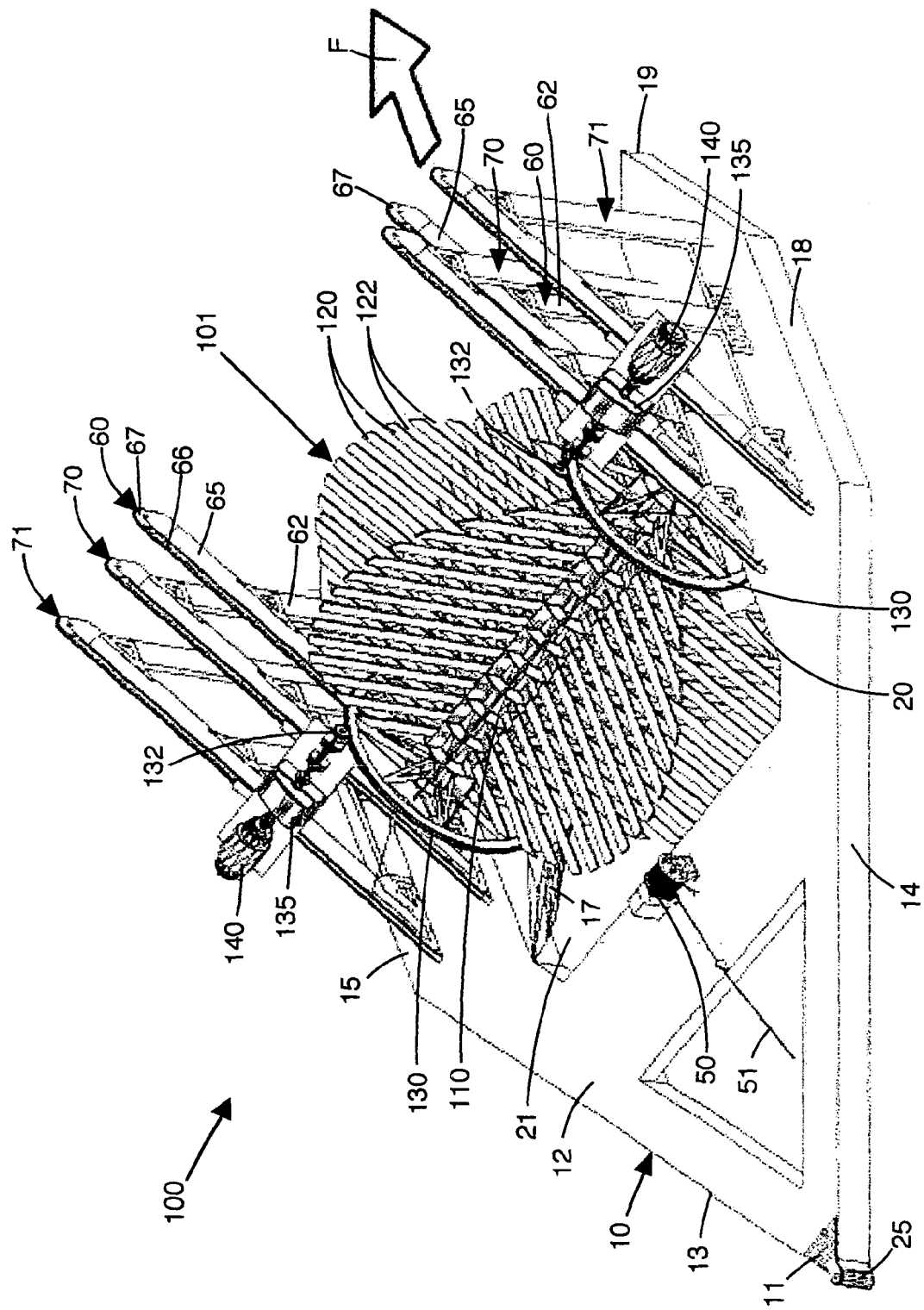
FIG. 1 is a perspective view of a first embodiment of the present invention.
Figure 2:
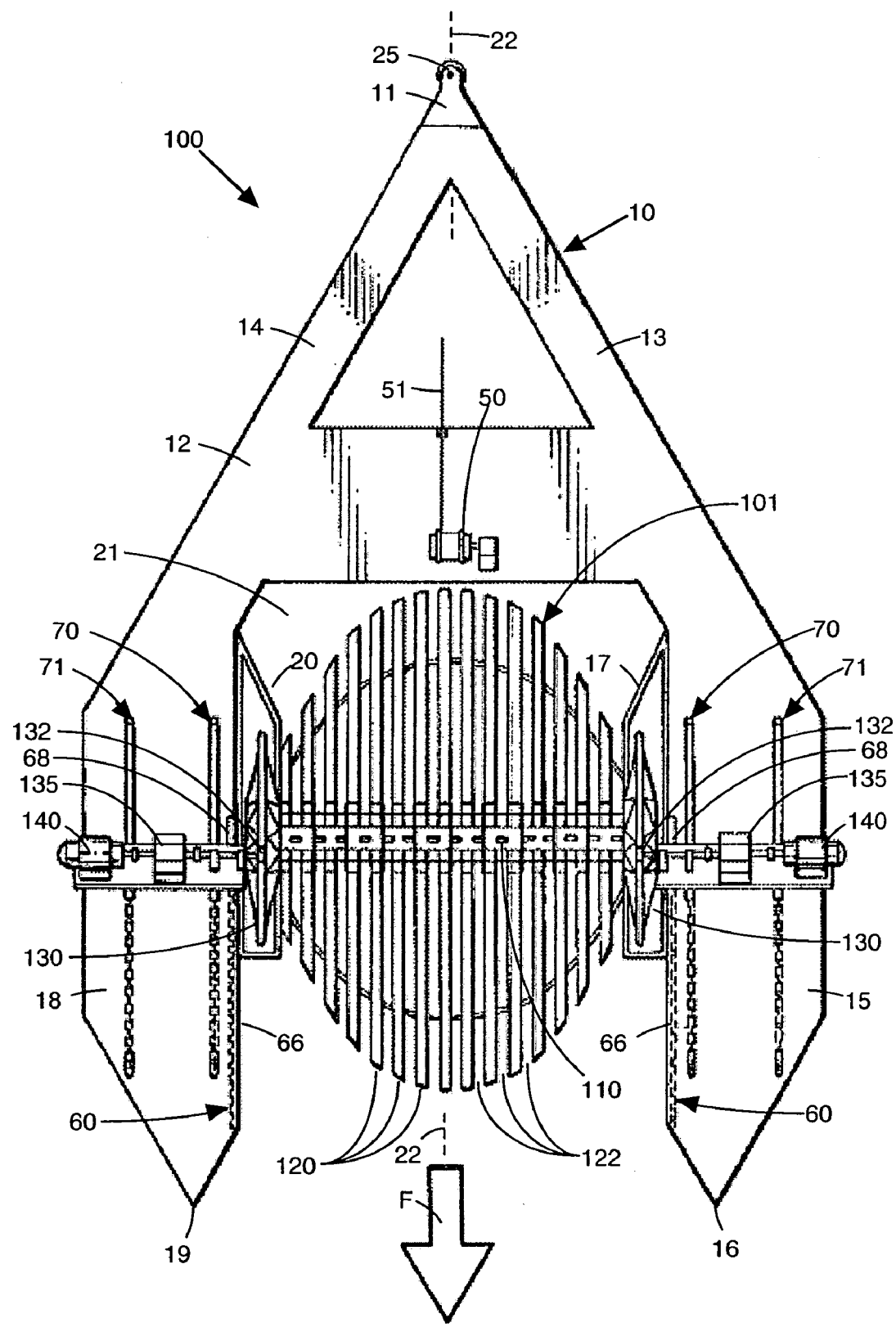
FIG. 2 is a top view of the embodiment shown in FIG. 1.
Figure 3:
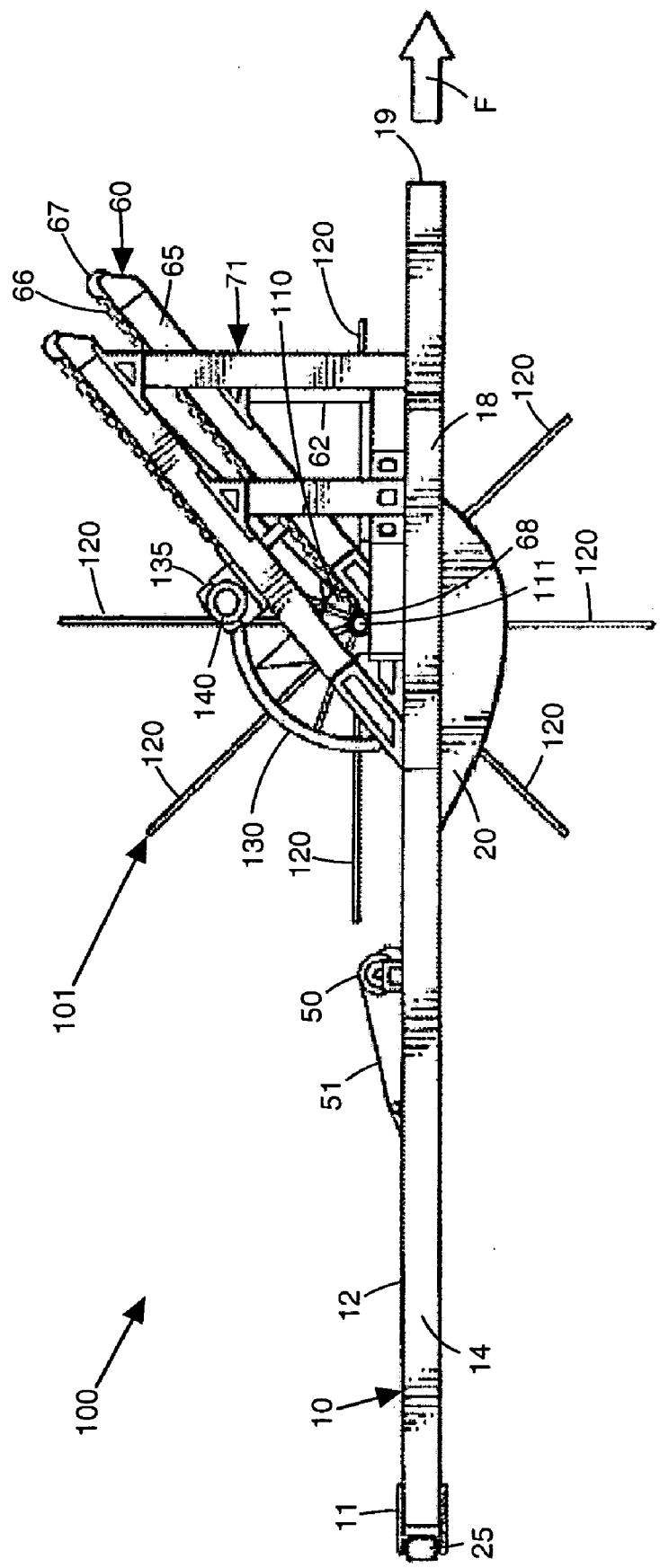
FIG. 3 is a side elevation view of the embodiment shown in FIG. 1.

As best seen in FIG. 4, a pair of transfer gears 130 are mounted on opposed ends of turbine rotor 110 for rotation therewith on axle 111. As indicated in FIGS. 1-2, each gear 130 is mechanically coupled to the shaft of an electrical generator 140 by a gear and transmission assembly 135 which determines the rotational speed of the generator relative to that of the rotor and the electrical energy generated as a result. Each gear and transmission assembly 135 includes a sprocket gear 132 which engages links 131 on the rim of the associated transfer gear 130. The transfer gears themselves are shielded by cowlings 17, 20 mounted on opposed interior sides of platform 10.

It is to be noted that cowlings 17, 20 not only serve to shield the transfer gears but also define opposed downwardly and longitudinally extending inner side walls of platform 10 which laterally bound downward opening 21 in the platform. Such inner sides walls serve to guide and confine or channel water current communicating with turbine blades 120.

Turbine blades 120 may be lowered or raised to varying depths within a water current. More particularly, and with reference to FIGS. 1-4, turbine 101 is carried by a pair of opposed elevators generally designated 60, each of which elevators comprises a framework 62 secured to platform 10. Each such framework includes a rail 65 which extends at an upward angle of about 45 degrees with respect to the surface of platform 10. Axle 111 is journalled within journal boxes 68 slidably carried by rail 65. The elevation of turbine 101, including blades 120, relative to platform 10 is thus determined by the position of the journal boxes along rails 65. Such elevation is secured by and may be adjusted by means of a chain 66 and pulley 67 mechanism.

Each gear and transmission assembly 135 is mounted on a pair of elevators generally designated 70, 71 and may be moved along associated rails either in tandem with or independently of the movement of turbine 101 along rails 65. The allowance of such independent movement enables either one or both of generators 140 to be decoupled from its associated transfer gear 130 if desired.

A winch 50 is mounted on platform 10 and a mooring cable 51 is reelably wound on the winch for attachment to an anchorage (not shown) located on bed of the body of water in which the platform floats. Downstream movement of the platform in a water current is thereby restrained. The winch and mooring cable also enable the position of platform 10 to be adjusted relative to the anchorage. Adjustment may be desirable not only when the platform is first moved into position but also if the water level subsequently changes.

Turbine blades 120 are preferably flexible. When a water current flows against the blades 120 while platform 10 is anchored, the blades resist and slow the rate of flow. This slowing effect is most pronounced closest to the rotor 110 since the surface of any given blade necessarily moves more slowly with increasing proximity to the rotor. A flow of water therefore tends to develop along the length of the blades from the rotor towards the outer ends of the blades. Flexing of the blades causes a degree of equalization of the water flow along their length. A portion of the flow also passes around the blades through spaces 122. The flow of water through spaces 122 in one row 125, 126 allows the flow to proceed directly towards the blades of the immediate downstream row 126, 125 and also generates sucking and whirl effects leading to an increased efficiency of power transfer relative to that seen with rigid blades. The spacing 122 between blades also generates turbulence which improves the oxygenation of the water. The spacing of blades within rows and the staggering of blades between rows also leads to a more uniform harnessing of the water flow as the direct force of the flow on the rotor is divided between successive blade rows rather than impacting a single surface. In consequence, the blades of a downstream row are never directly shielded from a direct incoming water current by the blades of an upstream row, as would be the case if the each row was replaced with a continuous unbroken surface.

With regard to the varying lengths of turbine blades 120, it will be noted that in the embodiment shown the blade lengths in any given row vary substantially smoothly from relatively short lengths for those ones of the blades positioned towards opposed ends of rotor 110 to relatively long lengths for those ones of the blades positioned towards the center of the rotor. Such variance may be considered desirable in cases where the strength of the natural water current varies in a corresponding manner widthwise of station 100. Under the influence of the station, the natural current will be accelerated to a significant degree as it is captured and channeled towards the turbine blades by the inner side walls 17, 20. Such acceleration will have a parabolic profile with a maximum towards the mid-line between the inner side walls and minimums along the inner side walls. Preferably, the lengths of blades 120 vary in a correspondingly parabolic manner.

In operation, station 100 is floated at a desired location in the current flow of a body of water; the forward end apex 15 of platform 10 being directed upstream in the water current flow (viz. in the direction opposite to arrow F), preferably at a point where the current is a maximum. Downstream movement of the station is restrained by securing mooring cable 51 to an anchorage. The position can be adjustably controlled with winch 50 by unreeling the cable from the winch or reeling the cable back on the winch.

Turbine 101 is elevated to a chosen position relative to a water surface by its mounting on platform 10. As the turbine rotates in response to the flow of water, mechanical power is delivered to electrical generators 140 via transfer gears 130 and transmission assemblies 135 to produce electricity. To compensate for changing water flow rates or to adjust the power output or rotation speed of the rotor for a given water flow rate, turbine 101 may be raised or lowered relative to the water surface by movement on elevators 60. Such movement changes the depth to which blades 120 will project in the water and thereby alters the forces acting on the blades.

If desired, additional power generation stations may be provided, advantageously with platform arrays as described above.

Figure 13:
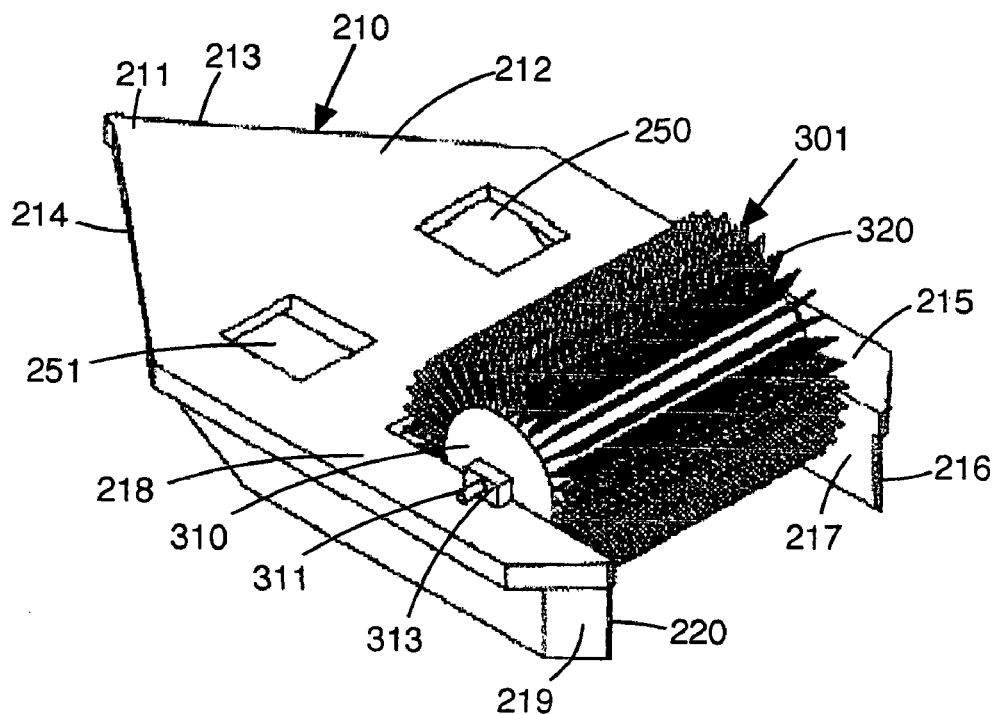
FIG. 13 is a perspective view of a second embodiment of the present invention.
Figure 14:
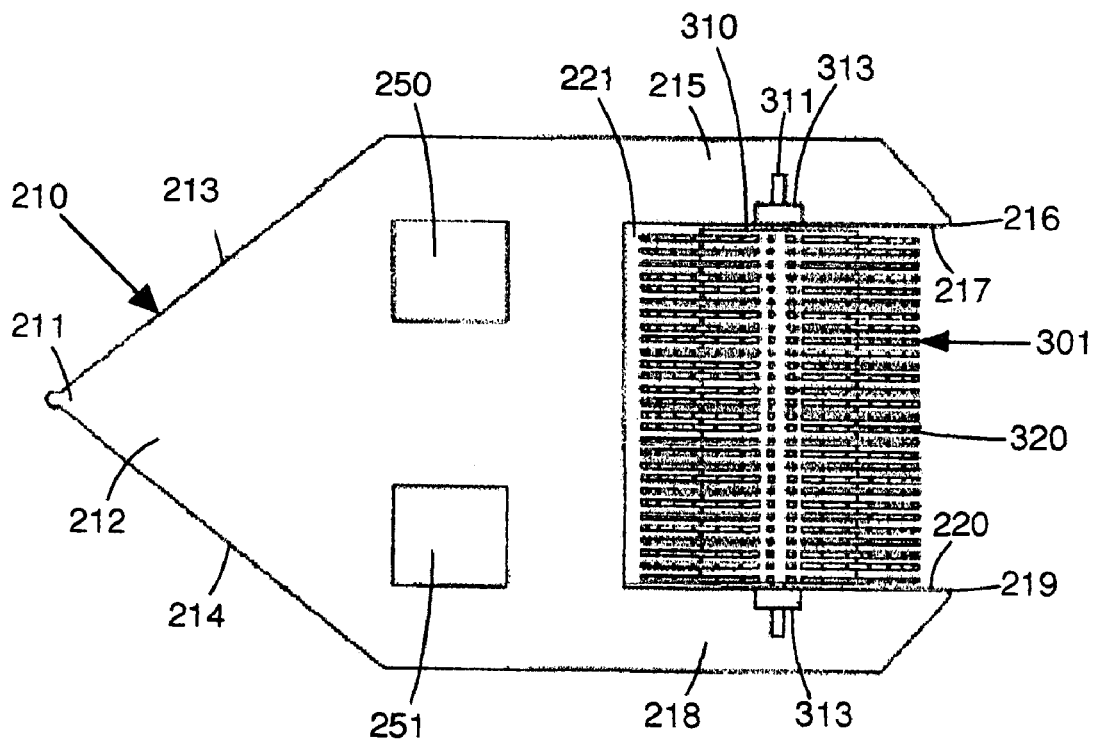
FIG. 14 is a top view of the embodiment shown in FIG. 13.
Figure 15:
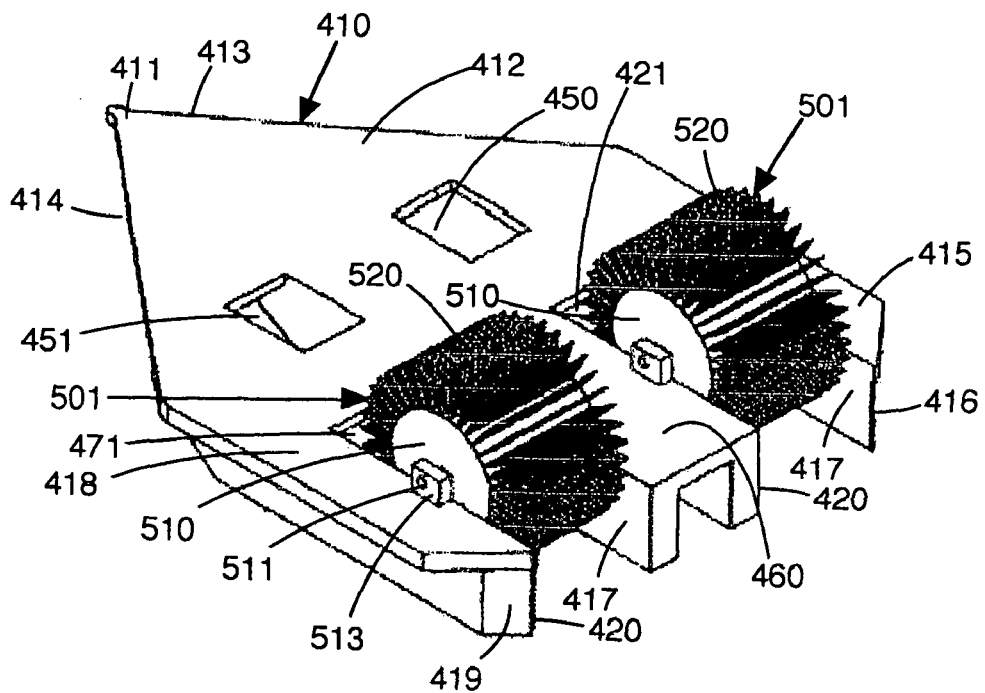
FIG. 15 is a perspective view of a third embodiment of the present invention.
Figure 16:
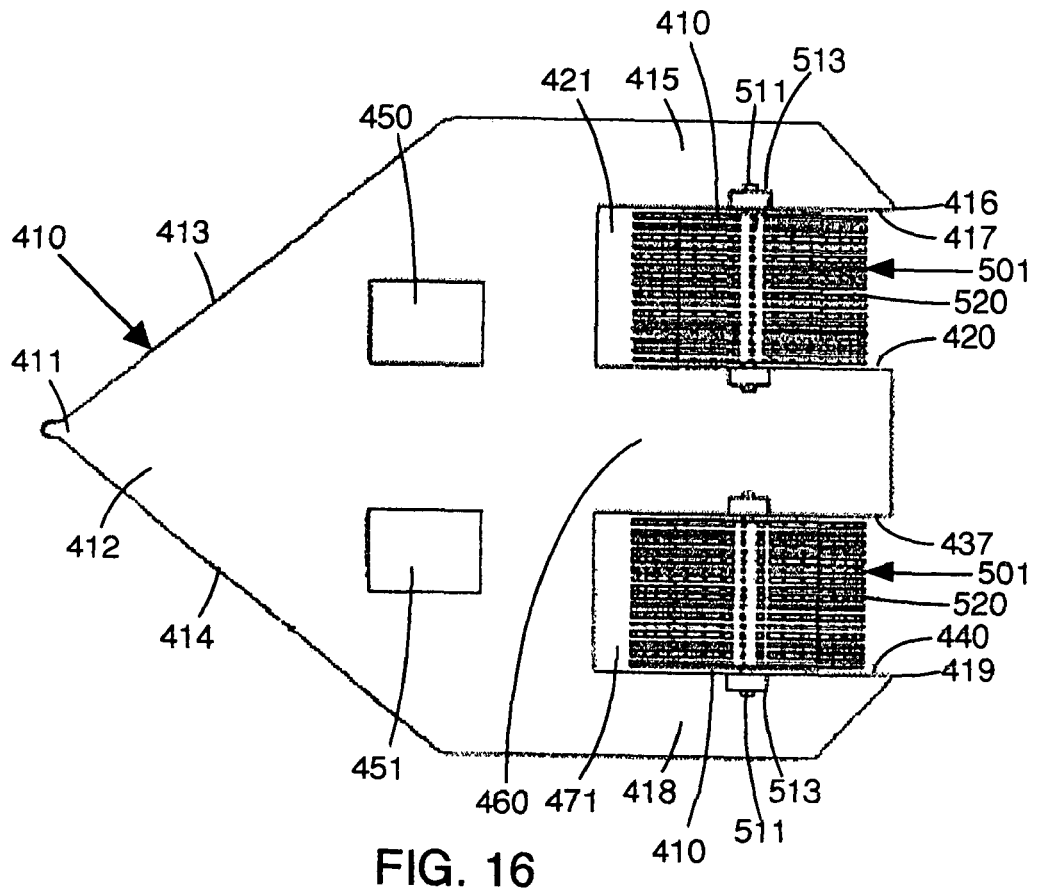
FIG. 16 is a top view of the embodiment shown in FIG. 15.

The first embodiment (FIGS. 1-12) is considered preferable in cases where the available water current is relatively slow (e.g. 1 m/sec.). The second embodiment illustrated in FIGS. 13-14 is preferred for faster currents. The third embodiment illustrated in FIGS. 15-16 is also preferred for faster currents and, further, for those cases where it is considered desirable to provide more than one water turbine on a single flotation platform. In the case of both the second and third embodiments, the associated water turbines are rotatably carried in fixed positions by their respective flotation platforms. Generators and their couplings to the turbine axles are not shown.

In more detail, the second embodiment (FIGS. 13-14) comprises a longitudinally extending flotation platform generally designated 210 and a water turbine generally designated 301 operatively carried by the platform for generating power in response to a current in a body of water. Turbine 301 comprises a turbine rotor 310 and a plurality of relatively narrow elongated turbine blades 320 extending outwardly from the rotor for operative communication with the water current. The rotor includes an axle 311 which is journalled within journal boxes 313 mounted on platform 210 at opposed end of the rotor.

Similar to the case of platform 10 described above, platform 210 includes a forward part 212 having opposed diverging sides 213, 214 extending outwardly and rearwardly from a forward end apex 211 to first and second elongated rearward parts 215, 218. Rearward part 215 extends longitudinally rearwardly from forward part 212 to a tapered distal end 216. Rearward part 218 extends longitudinally rearwardly from forward part 212 and substantially parallel to rearward part 215 to a tapered distal end 219. A longitudinal opening 221 extends downwardly through the platform between rearward parts 215, 218.

Platform 210 includes a pair of platform openings 250, 251 through which mooring cables or anchor lines (not shown) may be dropped. In contrast to the single mooring cable and winch indicated with reference to the first embodiment, more than one anchor point may be considered desirable in situations where the water current is relatively fast. The pair of openings 250, 251 provides passage for two independent anchor lines (not shown).

It is noted that the structure of platform 210, including diverging sides 213, 214 and tapered distal ends 216, 219, allows a number of such platforms to be assembled in a manner similar to that shown in FIGS. 11-12. Further, it is noted that platform 210 includes inner side walls 217, 220 which laterally bound opening 221 and which serve to guide and confine or channel water current communicating with turbine blades 320.

The third embodiment (FIGS. 15-16) comprises a longitudinally extending flotation platform generally designated 410 and a pair of water turbines generally designated 501 operatively carried by the platform for generating power in response to a current in a body of water. Turbines 501 each comprise a turbine rotor 510 and a plurality of relatively narrow elongated turbine blades 520 extending outwardly from the rotor for operative communication with the water current. Each rotor includes an axle 511 which is journalled within journal boxes 513 mounted on platform 410 at opposed end of the rotor.

Similar to the case of platform 10 described above, platform 410 includes a forward part 412 having opposed diverging sides 413, 414 extending outwardly and rearwardly from a forward end apex 411 to first and second elongated rearward parts 415, 418. Rearward part 415 extends longitudinally rearwardly from forward part 412 to a tapered distal end 416. Rearward part 418 extends longitudinally rearwardly from forward part 412 and substantially parallel to rearward part 415 to a tapered distal end 419. As in the case of platform 210, platform 410 includes a pair of platform openings 450, 451 through which mooring cables or anchor lines (not shown) may be dropped.

The third embodiment (FIGS. 15-16) differs from the second embodiment (FIGS. 13-14) in that it includes two turbines 501 rather than a single turbine 301. Further, in contrast to platform 210, platform 410 includes a third elongated rearward part 460 positioned mid-way between its first and second rearward parts 415, 418. Rearward part 460 extends longitudinally rearwardly from forward part 412 substantially parallel to the first and second rearward parts 415, 418, and a pair of longitudinal openings 421, 471 extend downwardly through the platform between rearward parts 415, 418, the pair being separated by rearward part 460.

It is noted that the structure of platform 410, including diverging sides 413, 414 and tapered distal ends 416, 419, allows a number of such platforms to be assembled in a manner similar to that shown in FIGS. 11-12. Further, it is noted that platform 410 includes inner side walls 417, 420 and 437, 440 which respectively laterally bound openings 421, 471 and which serve to guide and confine or channel water current communicating with turbine blades 520.

Figure 17:
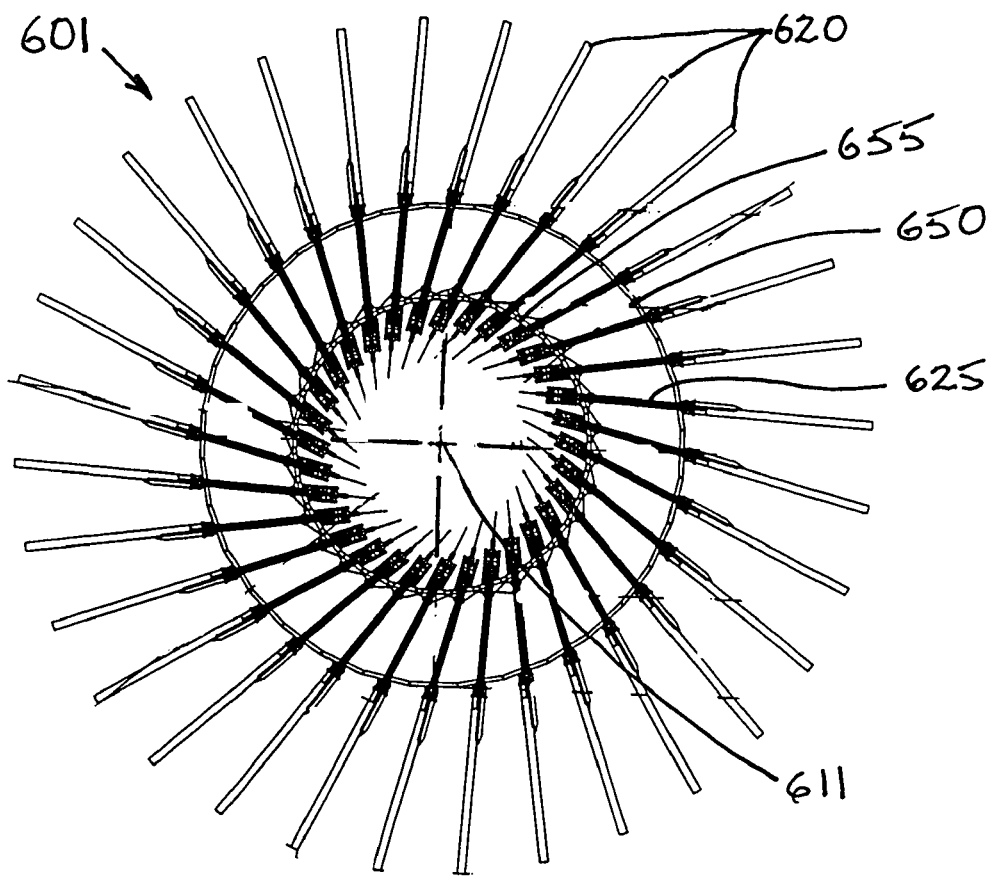
FIG. 17 is a section elevation view representative of any of the water turbines shown in FIGS. 13-16.
Figure 18:
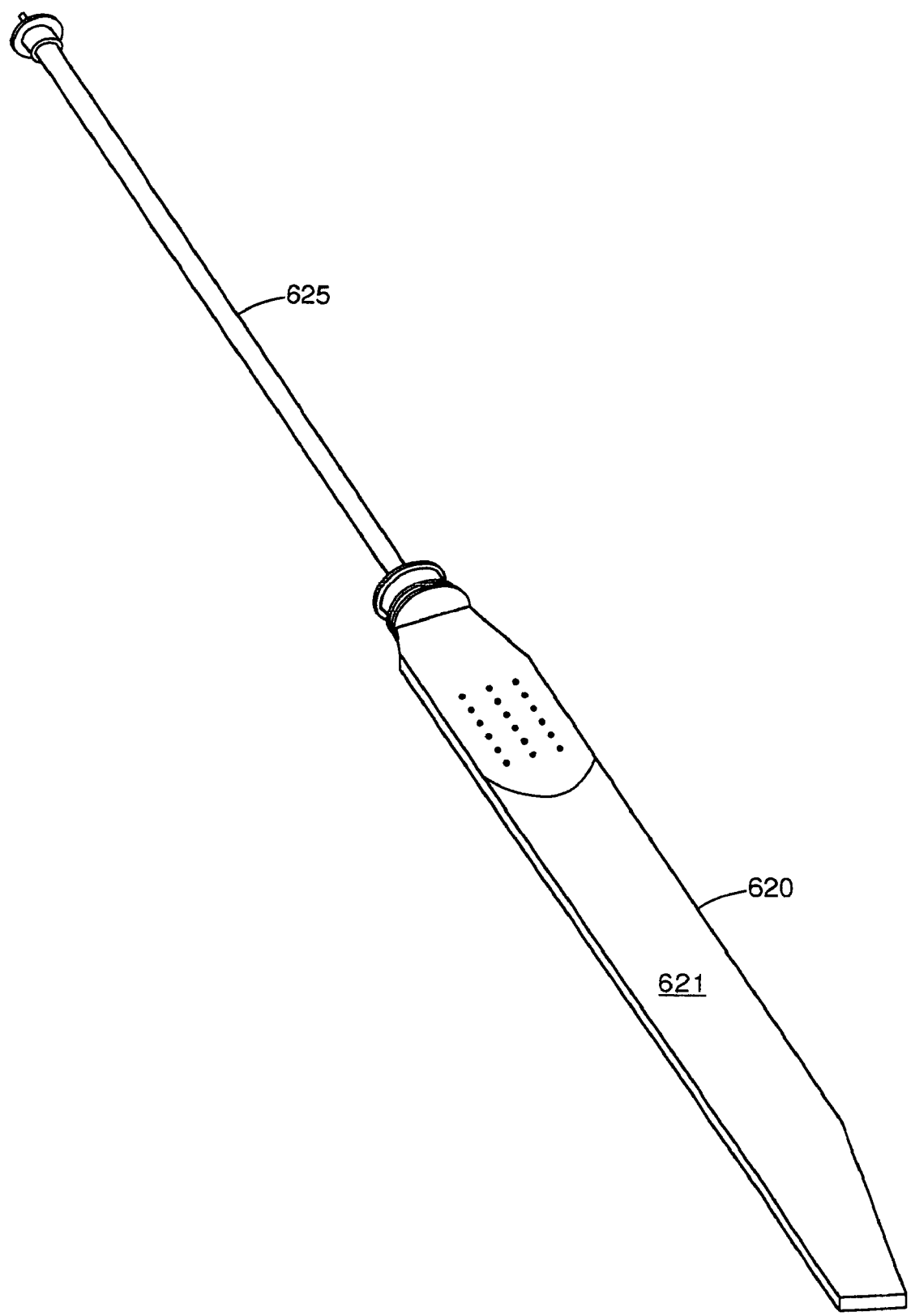
FIG. 18 is a perspective view representative of any one of the turbine blades shown in FIG. 17.

FIG. 17 is a section elevation view of a water turbine generally designated 601, and which may be considered representative of a corresponding section of either water turbine 301 or water turbine 501. FIG. 18 is a perspective of one of the turbine blades 620 shown in FIG. 17. As can be seen, the rotor of turbine 601 comprises generally cylindrical outer and inner tubes 650, 655 which normally rotate counterclockwise on the axis 611 of an axle (not shown). Turbine blades 620 project outwardly from tube 650 and are each supported by an elongated shaft 625 which in turn is supported towards its opposed ends by tubes 650, 655. Preferably the blades are rotatably supported so that the angle of incidence between their surfaces 621 and the direction of water flow can be varied to present more or less resistance to the water flow. By rotating the blades, the rotation speed of the turbine and the resulting power output for a given water flow rate can be adjusted. Similarly, adjustments can be made to compensate for changing water flow rates.

Figure 19:
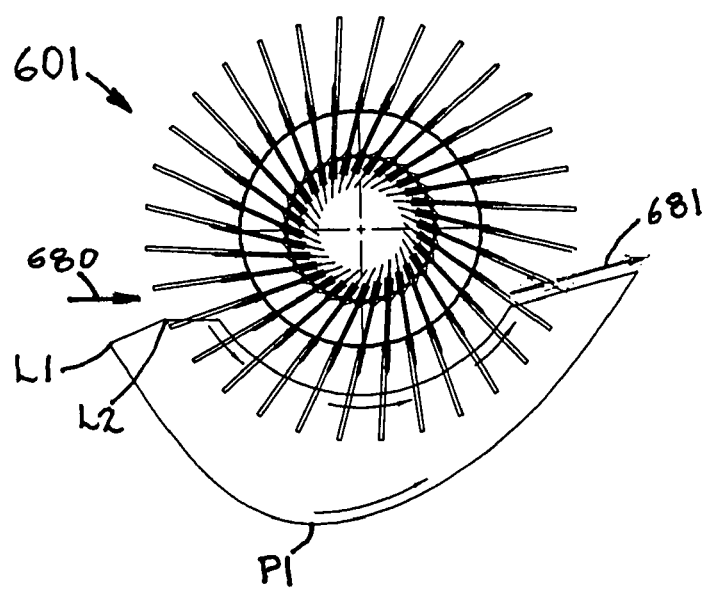
FIG. 19 shows the direction and action of water flow beneath the turbine shown in FIG. 17.

The general character of water flowing beneath turbine 601 is indicated in FIG. 19. Water enters horizontally into contact with the blade region at 680 and exits at an upward angle at 681 (viz. a rooster-tail angle). When water enters, it meets with the turbine rotor (outer tube 650 thereof) which tends to act as a dam raising the level of water ahead of the rotor from L1 to L2. The result is a higher head pressure which serves to accelerate the speed of water acting on and passing between blades 620. The continuing flow follows a path beneath the rotor which exerts a pressure force on the water which develops to a maximum at P1. As a suction develops, pressure then begins to decrease as the flow accelerates towards exit 681.

The overall size of stations such as those represented by the second and third embodiments may be substantial. For example, in an exemplary case, platform 210 has an overall length of about 115 m, and overall width of about 70 m, and an overall height of about 16 m. The space between inner side walls 217, 220 is about 50 m. Rotor 310 has an outer drum diameter of about 20 m and an inner drum diameter of about 12 m. The tips of blades 320 are distanced about 18 m from the rotor axis. The scale of the third embodiment may be similar. Of course, it will be understood that overall dimensions, turbine size including blade lengths and so forth may differ significantly from one case to the next. Applicable criteria will include water depth, anticipated water currents and desired power output.

A variety of modifications, changes and variations to the embodiments described are possible within the spirit and scope of the following claims and will be apparent to those skilled in the art. The invention is not restricted to the specific embodiments described herein.

The invention claimed is:

1. Apparatus for generating power from a water current in a body of water, said apparatus comprising:

(a) a longitudinally extending flotation platform for maintaining said apparatus afloat in said body of water, said platform comprising:

(i) a forward part having opposed diverging sides extending outwardly and rearwardly from a forward end apex to first and second elongated rearward parts, said first rearward part extending longitudinally rearwardly from said forward part to a distal end of said first rearward part, said second rearward part extending longitudinally rearwardly from said forward part substantially parallel to said first rearward part to a distal end of said second rearward part; and, (ii) a longitudinal opening extending downwardly through said platform between said first and second rearward parts; and, (b) a water turbine operatively carried by said platform for generating power in response to the water current in said body of water, said turbine comprising:

(i) a turbine rotor longitudinally extending transversely across said opening between opposed ends of the rotor, said rotor rotatably mounted to said platform for rotation about a rotor axis; and (ii) a plurality of relatively narrow, flexible elongated turbine blades arranged in circumferentially spaced rows extending along said rotor and extending outwardly from said rotor for operative communication with said water current through said downward opening, the blades in each of said rows being distanced from each other in succession by a space, wherein said blades have lengths which vary substantially smoothly from relatively short lengths for those ones of said blades positioned towards said opposed ends of said rotor to relatively long lengths for those ones of said blades positioned towards the center of said rotor between said opposed ends.

2. Apparatus as defined in claim 1, wherein said turbine is carried by said platform at an adjustable elevation in relation to said platform.

3. Apparatus as defined in claim 1, further including a chain and a pulley for adjusting the elevation of said turbine relative to said platform.

4. Apparatus as defined in claim 1, further including a winch mounted on said platform and a mooring cable reelably wound on said winch, said cable attachable to an anchorage whereby downstream movement of said platform is restrained.

5. Apparatus as defined in claim 1, further including a deflector mounted to said platform at said forward end for deflecting debris floating in said body of water.

6. Apparatus for generating power from a water current in a body of water, said apparatus comprising:

(a) a longitudinally extending flotation platform for maintaining said apparatus afloat in said body of water, said platform comprising:

(i) a forward part having opposed diverging sides extending outwardly and rearwardly from a forward end apex to first and second elongated rearward parts, said first rearward part extending longitudinally rearwardly from said forward part to a distal end of said first rearward part, said second rearward part extending longitudinally rearwardly from said forward part substantially parallel to said first rearward part to a distal end of said second rearward part; and, (ii) a longitudinal opening extending downwardly through said platform between said first and second rearward parts; and, (b) a water turbine operatively carried by said platform for generating power in response to the water current in said body of water, said turbine comprising:

(i) a turbine rotor longitudinally extending transversely across said opening between opposed ends of the rotor, said rotor rotatably mounted to said platform for rotation about a rotor axis; and, (ii) a plurality of relatively narrow, flexible elongated turbine blades arranged in circumferentially spaced rows extending alone said rotor and extending outwardly from said rotor for operative communication with said water current through said downward opening, the blades in each of said rows being distanced from each other in succession by a space, wherein:

said rows are staggered such that the blades in a given one of said rows circumferentially align with spaces between blades in a row immediately circumferentially forward of the given row and with the spaces between blades in a row immediately circumferentially rearward of the given row, and said blades have lengths which vary substantially smoothly from relatively short lengths for those ones of said blades positioned towards said opposed ends of said rotor to relatively long lengths for those ones of said blades positioned towards the center of said rotor between said opposed ends.

7. Apparatus as defined in claim 6, wherein said lengths of said blades vary substantially parabolically between said opposed ends.

8. Apparatus as defined in any one of claims 1 or 2 to 7, wherein said opening is laterally bounded by opposed downwardly and longitudinally extending inner side walls for channeling water current communicating with said blades.

9. A water turbine comprising:
(a) a turbine rotor longitudinally extending between opposed ends of the rotor; and,
(b) a plurality of relatively narrow, flexible elongated turbine blades extending outwardly from said rotor for communication with a water current, wherein:
(i) said blades are arranged in circumferentially spaced rows extending along said rotor;
(ii) in each of said rows said blades are distanced from each other in succession by a space; and,
(iii) said rows are staggered such that the blades in a given one of said rows circumferentially align with spaces between blades in a row immediately circumferentially forward of the given row and with the spaces between blades in a row immediately circumferentially rearward of the given row, wherein the lengths of said blades vary substantially smoothly from a minimum length for those ones of said blades positioned towards said opposed ends of said rotor to a maximum length for said blades positioned intermediate said opposed ends.

10. A water turbine as defined in claim 9, wherein said blades have lengths which vary substantially parabolically between said opposed ends.

11. A method of generating power from a water current in a body of water, said method comprising:
(a) providing a first power generation station, said station comprising (i) a longitudinally extending flotation platform for maintaining said station afloat in said body of water, said platform comprising:

(A) a forward part having opposed diverging sides each extending outwardly and rearwardly from a forward end apex to first and second elongated rearward parts, said first rearward part extending longitudinally rearwardly from said forward part to a first distal end; said second rearward part extending longitudinally rearwardly from said forward part substantially parallel to said first rearward part to a second distal end; and, (B) a longitudinal opening extending downwardly through said platform between said first and second rearward parts; and, (ii) a water turbine operatively carried by said platform for generating power in response to the water current in said body of water, said turbine comprising:

(A) a turbine rotor longitudinally extending transversely across said opening between opposed ends of said rotor, said rotor rotatably mounted to said platform for rotation about a rotor axis; and, (B) a plurality of turbine blades extending outwardly from said rotor for operative communication with said water current through said downward opening;

(b) floating said station in said body of water with said forward end apex directed upstream in said water current;

(c) controllably restraining downstream movement of said platform;

(d) providing second and third power generation stations, each comprising a flotation platform substantially the same as the flotation platform of said first power generation station;

(e) floating said second station in said body of water with the forward end apex of said second platform positioned proximate to said first distal end of said first platform; and, (f) floating said third station in said body of water with the forward end apex of said third platform positioned proximate to said second distal end of said first platform.

12. A method as described in claim 11, wherein said second and third power generation stations each comprise a water turbine substantially the same as the water turbine of said first power generation station.

13. A method as defined in claim 11, wherein said first and second distal ends each have an angle of taper which conforms with the angle at which said diverging sides of the forward part of said platform extend rearwardly from said forward end apex of said platform.

14. A method of generating power from a water current in a body of water, said method comprising:
(a) providing a first power generation station, said station comprising
(i) a longitudinally extending flotation platform for maintaining said station afloat in said body of water, said platform comprising:
(A) a forward part having opposed diverging sides each extending outwardly and rearwardly from a forward end apex to first and second elongated rearward parts, said first rearward part extending longitudinally rearwardly from said forward part to a first distal end; said second rearward part extending longitudinally rearwardly from said forward part substantially parallel to said first rearward part to a second distal end; and,
(B) a longitudinal opening extending downwardly through said platform between said first and second rearward parts; and
(ii) a water turbine operatively carried by said platform for generating power in response to the water current in said body of water, said turbine comprising:
(A) a turbine rotor longitudinally extending transversely across said opening between opposed ends of said rotor, said rotor rotatably mounted to said platform for rotation about a rotor axis; and,
(B) a plurality of turbine blades extending outwardly from said rotor for operative communication with said water current through said downward opening;
(b) floating said station in said body of water with said forward end apex directed upstream in said water current; and
(c) controllably restraining downstream movement of said platform, wherein:
said blades are relatively narrow, flexible elongated blades arranged in circumferentially spaced rows extending alone said rotor;
in each of said rows said blades are distanced from each other in succession by a space; and
said blades have lengths which vary substantially smoothly from relatively short lengths for those ones of said blades positioned towards said opposed ends of said rotor to relatively long lengths for those ones of said blades positioned towards the center of said rotor between said opposed ends.

15. A method of generating power from a water current in a body of water, said method comprising:
(a) providing a first power generation station, said station comprising
(i) a longitudinally extending flotation platform for maintaining said station afloat in said body of water, said platform comprising:
(A) a forward part having opposed diverging sides each extending outwardly and rearwardly from a forward end apex to first and second elongated rearward parts, said first rearward part extending longitudinally rearwardly from said forward part to a first distal end; said second rearward part extending longitudinally rearwardly from said forward part substantially parallel to said first rearward part to a second distal end; and,
(B) a longitudinal opening extending downwardly through said platform between said first and second rearward parts; and
(ii) a water turbine operatively carried by said platform for generating power in response to the water current in said body of water, said turbine comprising:
(A) a turbine rotor longitudinally extending transversely across said opening between opposed ends of said rotor, said rotor rotatably mounted to said platform for rotation about a rotor axis; and,
(B) a plurality of turbine blades extending outwardly from said rotor for operative communication with said water current through said downward opening;
(b) floating said station in said body of water with said forward end apex directed upstream in said water current; and,
(c) controllably restraining downstream movement of said platform,
wherein:
said blades are relatively narrow, flexible elongated blades arranged in circumferentially spaced rows extending along said rotor;
in each of said rows said blades are distanced from each other in succession by a space;
said rows are staggered such that the blades in a given one of said rows circumferentially align with spaces between blades in a row immediately circumferentially forward of the given row and with the spaces between blades in a row immediately circumferentially rearward of the given row; and
said blades have lengths which vary substantially smoothly from relatively short lengths for those ones of said blades positioned towards said opposed ends of said rotor to relatively long lengths for those ones of said blades positioned towards the center of said rotor between said opposed ends.

16. A method as defined in claim 15, wherein the lengths of said blades vary substantially parabolically between said opposed ends.

17. A method as defined in any one of claims 11, 12, 14, 15 or 16, wherein said opening is laterally bounded by opposed downwardly and longitudinally extending inner side walls for channeling water current communicating with said blades.

* * * * *